United States Patent
Chapman, Jr. et al.

(10) Patent No.: US 7,188,002 B2
(45) Date of Patent: Mar. 6, 2007

(54) APPLIANCE DIAGNOSTIC DISPLAY APPARATUS AND NETWORK INCORPORATING SAME

(75) Inventors: John Gilman Chapman, Jr., Delaware, OH (US); Nicholas Ashworth, Dublin, OH (US); Robert Burt, Columbus, OH (US); Timothy E. Wallaert, New Hudson, MI (US)

(73) Assignee: Maple Chase Company, Carol Stream, IL (US)

( * ) Notice: Subject to any disclaimer, the term of this patent is extended or adjusted under 35 U.S.C. 154(b) by 207 days.

(21) Appl. No.: 11/031,087

(22) Filed: Jan. 6, 2005

(65) Prior Publication Data

US 2005/0154496 A1     Jul. 14, 2005

Related U.S. Application Data

(60) Provisional application No. 60/535,287, filed on Jan. 8, 2004.

(51) Int. Cl.
| | |
|---|---|
| *G01M 1/38* | (2006.01) |
| *G05B 13/00* | (2006.01) |
| *G05B 15/00* | (2006.01) |
| *G05B 21/00* | (2006.01) |
| *G05D 23/00* | (2006.01) |
| *G05B 11/01* | (2006.01) |

(52) U.S. Cl. .................... 700/276; 700/15; 700/83; 700/278; 700/300; 236/1 B; 236/1 E; 236/94; 165/200; 165/209; 165/287; 714/25; 340/500; 340/501; 340/539.24; 340/691.6

(58) Field of Classification Search ............... 700/26, 700/65, 66, 276, 277, 278, 300, 15, 17, 83; 236/1 B, 1 E, 51, 94; 340/500, 501, 502, 340/507, 539.24, 691.6; 165/200, 287, 209; 714/25

See application file for complete search history.

(56) References Cited

U.S. PATENT DOCUMENTS

| | | | | |
|---|---|---|---|---|
| 5,289,362 A | * | 2/1994 | Liebl et al. ............. | 700/22 |
| 5,682,949 A | * | 11/1997 | Ratcliffe et al. ......... | 165/209 |
| 5,801,940 A | * | 9/1998 | Russ et al. .............. | 700/9 |
| 6,122,603 A | * | 9/2000 | Budike, Jr. ............. | 702/182 |
| 6,196,467 B1 | * | 3/2001 | Dushane et al. ........ | 236/46 R |

(Continued)

*Primary Examiner*—Ramesh Patel
(74) *Attorney, Agent, or Firm*—Reinhart Boerner Van Deuren P.C.

(57) ABSTRACT

An appliance diagnostic display and interface system providing a centralized user interface for appliance diagnostic information and control of system self-tests is provided. This centralized user interface is provided via an intelligent thermostat that includes an LCD display. The intelligent thermostat interfaces, via wireless or wired communications, with the appliances installed in the home. The intelligent thermostat then generates and displays various user interface screens that allow particular appliances to be selected. Separate appliance specific screens are then generated that allow the user to access the diagnostic information in system test functionality provided by the individual appliance. Soft function keys provided on the intelligent thermostat allow multi-functional access to the features of the invention depending on which screen is currently being displayed.

20 Claims, 2 Drawing Sheets

U.S. PATENT DOCUMENTS

| | | | |
|---|---|---|---|
| 6,385,510 B1* | 5/2002 | Hoog et al. | 700/276 |
| 6,499,114 B1* | 12/2002 | Almstead et al. | 714/25 |
| 6,851,621 B1* | 2/2005 | Wacker et al. | 236/51 |
| 7,135,965 B2* | 11/2006 | Chapman et al. | 340/514 |
| 2003/0034898 A1* | 2/2003 | Shamoon et al. | 340/825.72 |
| 2005/0055432 A1* | 3/2005 | Rodgers | 709/223 |
| 2005/0090915 A1* | 4/2005 | Geiwitz | 700/90 |
| 2005/0116055 A1* | 6/2005 | Alles | 236/49.1 |
| 2006/0025891 A1* | 2/2006 | Budike | 700/275 |
| 2006/0049268 A1* | 3/2006 | Weimer et al. | 236/51 |

* cited by examiner

APPLIANCE DIAGNOSTIC DISPLAY APPARATUS AND NETWORK INCORPORATING SAME

CROSS-REFERENCE TO RELATED PATENT APPLICATIONS

This patent application claims the benefit of U.S. Provisional Patent Application Ser. No. 60/535,287, filed Jan. 8, 2004, the teachings and disclosure of which are hereby incorporated in their entireties by reference thereto.

FIELD OF THE INVENTION

The present invention relates generally to diagnostic and self-test systems, and more particularly to appliance diagnostic and self-test systems for consumer appliances and the like.

BACKGROUND OF THE INVENTION

As consumer electronics continue to decrease in cost and increase in reliability and features provided, their use in many consumer products becomes more practical, and even desirable. One factor contributing to the acceptability of electronic controls in many consumer products, including consumer home appliances, is that the population as a whole are becoming more computer literate and used to electronic displays and push button controls. No longer are consumers turned off by electronic displays and control systems in favor of their electromechanical counterparts. Indeed, consumers have come to demand increased sophistication in the cycles provided by their appliances.

To meet this demand, many manufacturers are now providing multi-functional electronic controls in their consumer appliances. As an added benefit of these electronic controls manufacturers are able to incorporate intelligence into the controls that can detect and diagnose problems with the appliance. This functionality greatly reduces the service time required to diagnose a problem with an appliance by a service technician when a problem with the appliance occurs. Unfortunately, most consumer appliances do not include an easy means to display this diagnostic information, including product failures, to a homeowner or a service technician. Adding such a user interface display to many of these appliances is not cost effective. In order to relay this diagnostic information to the service personnel, many such appliances are integrating communications capability, either wired or wireless interfaces, to allow the system diagnostic information to be provided to the service technician. Unfortunately, most consumers do not have the equipment necessary to download this diagnostic information from the appliance, and therefore must resort to prior troubleshooting methods if they wish to maintain their appliance themselves, or must call a service technician.

There exists, therefore, a need in the art for an easy to use user interface in the home that includes a means to display the diagnostic data provided by the appliance without requiring the purchase of stand alone diagnostic tools as used by a typical service technician.

BRIEF SUMMARY OF THE INVENTION

In view of the above, it is an object of the present invention to provide a new and improved user interface display for appliance diagnostic information. More particularly, it is an object of the present invention to provide a new and improved user interface and display that is capable of receiving and displaying appliance diagnostic information from various consumer appliances in the home. Still further, it is an object of the present invention to provide this user interface that is also capable of initiating appliance system self-tests and other diagnostic testing routines provided within the appliance controllers to verify correct system operation, and to troubleshoot suspected or apparent problems. It is an additional object of the present invention to utilize a wireless communications protocol to provide this functionality. Alternatively, it is an object of the present invention to provide a wired communications network to provide this functionality.

In an embodiment of the present invention, an advanced thermostat that includes a user interface and wireless or wired network communications capability to enable control and diagnostic communications between the thermostat and the various consumer appliances in the home. The thermostat user interface allows the homeowner or service technician to view diagnostic information for the appliances as well as execute system tests. The thermostat could then display the results of any such system tests. In this way, the system of the present invention leverages the graphical user interface provided by the thermostat to enable advanced diagnostics and system tests of appliance controls.

BRIEF DESCRIPTION OF THE DRAWINGS

The accompanying drawings incorporated in and forming a part of the specification illustrate several aspects of the present invention, and together with the description serve to explain the principles of the invention. In the drawings.

While the invention will be described in connection with certain preferred embodiments, there is no intent to limit it to those embodiments. On the contrary, the intent is to cover all alternatives, modifications and equivalents as included within the spirit and scope of the invention as defined by the appended claims.

DETAILED DESCRIPTION OF THE INVENTION

Figure 1:
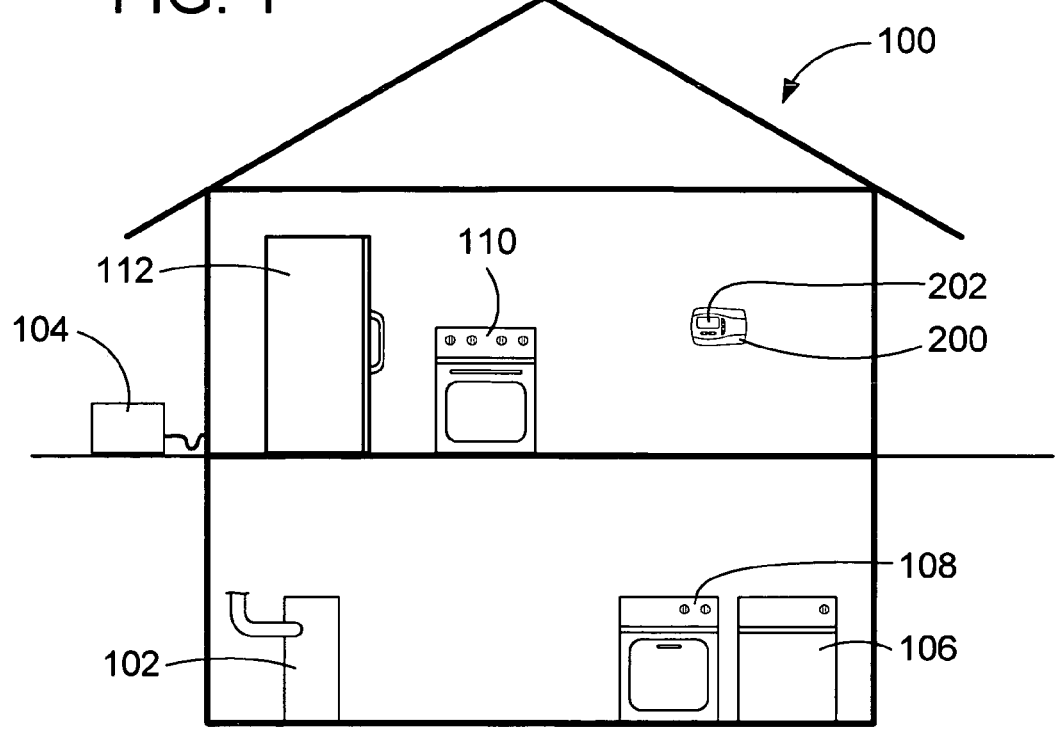
FIG. 1 is a simplified illustration of a home environment containing a plurality of consumer appliances in which the system of the instant invention is installed.

FIG. 1 illustrates a simplified home environment 100 into which the system of the present invention finds particular applicability. However, one skilled in the art will recognize that the system of the present invention is not limited to a home environment, but may also be installed in a commercial environment, etc. This typical home environment 100 includes an intelligent thermostat 200. As is typical, the thermostat 200 controls heating of the home environment 100 by the furnace 102, and possibly cooling of the home environment 100 by the air conditioning system 104. The interface to both the furnace 102 and the air conditioning system 104 is typically pre-wired in the home environment 100, although the communications control from the thermostat 200 to the furnace 102 and to the air conditioning system 104 may also be wireless as desired by providing receiver/transmitter circuitry in the furnace 102 and air conditioning system 104. Similar receiver/transmitter circuitry is also required in thermostat 200 to provide this communications capability.

The typical home environment 100 also includes a plurality of consumer appliances, such as a washer 106 and dryer 108, a stove 110, refrigerator 112, etc. As discussed above, many such appliances 102–112 now include electronic controllers that regulate operation of the appliance. These electronic controllers also typically now provide diagnostic system testing and collection of diagnostic system and failure information relating to the operation of the appliance. Unfortunately, while some types of consumer appliances are beginning to utilize LCD displays, most such appliances do not provide any means to provide such diagnostic system and failure information to the consumer or service technician. While many such appliances include an LED or other failure indicator, such indication is of little help to determine what needs to be done to fix the appliance. However, as will be discussed in greater detail below, the advanced thermostat 200 of the present invention does include a consumer interface display 202 that may be utilized through the system of the present invention to display such system diagnostic and failure information. Additionally, as will also be discussed more fully below, the advance thermostat 200 of the present invention may also be utilized to initiate system diagnostic tests for the consumer appliances that provide such capability.

In order to provide the diagnostic information on the display 202 of the thermostat 200 of the present invention, the information must be communicated from the appliances 102–112 to the thermostat 200. This transmission of information may be facilitated by a wired network connecting each of the appliances 102–112 to the thermostat 200. Other wired network structures may also be utilized, including the provision of a system BUS to which each of the appliances 102–112 and the thermostat 200 connect. As is well known in the art, information communicated on the system BUS includes address information identifying the source and/or destination of the information transmitted thereon. Such individual addressing is not typically required in the wired network whereby each individual appliance is separately wired to the thermostat 200. Various other wired infrastructures could be utilized with the system of the present invention, and are considered within the scope thereof.

With the increasing use, sophistication, reliability, data rates, and security of wireless communication protocols, a preferred embodiment of the present invention utilizes wireless communication between the appliances and thermostat to communicate system diagnostic information and self-test control signals therebetween. However, it is recognized that not all of the consumer appliances may include such wireless communications capability. Therefore, a preferred embodiment to the thermostat 200 of the present invention includes the capability to communicate both wirelessly and through a wired connection.

For the wireless communication, various wireless communication protocols and standards may be implemented depending upon the particular home environment 100 in which the system is to be installed. That is, while the Bluetooth wireless standard may be utilized in a very small environment, its range limitations may make it unsuitable for larger or typical home environments 100. However, there are numerous other wireless protocols that can be utilized to provide the wireless connectivity between the thermostat 200 and the appliances for which service diagnostic information and self-test control may be provided. These other wireless protocols include, but are not limited to, the 802.11 or 802.15 family of standards. While proprietary wireless protocols may also be utilized, the use of a standard wireless protocol ensures interoperability with appliances by different manufacturers.

Figure 2:
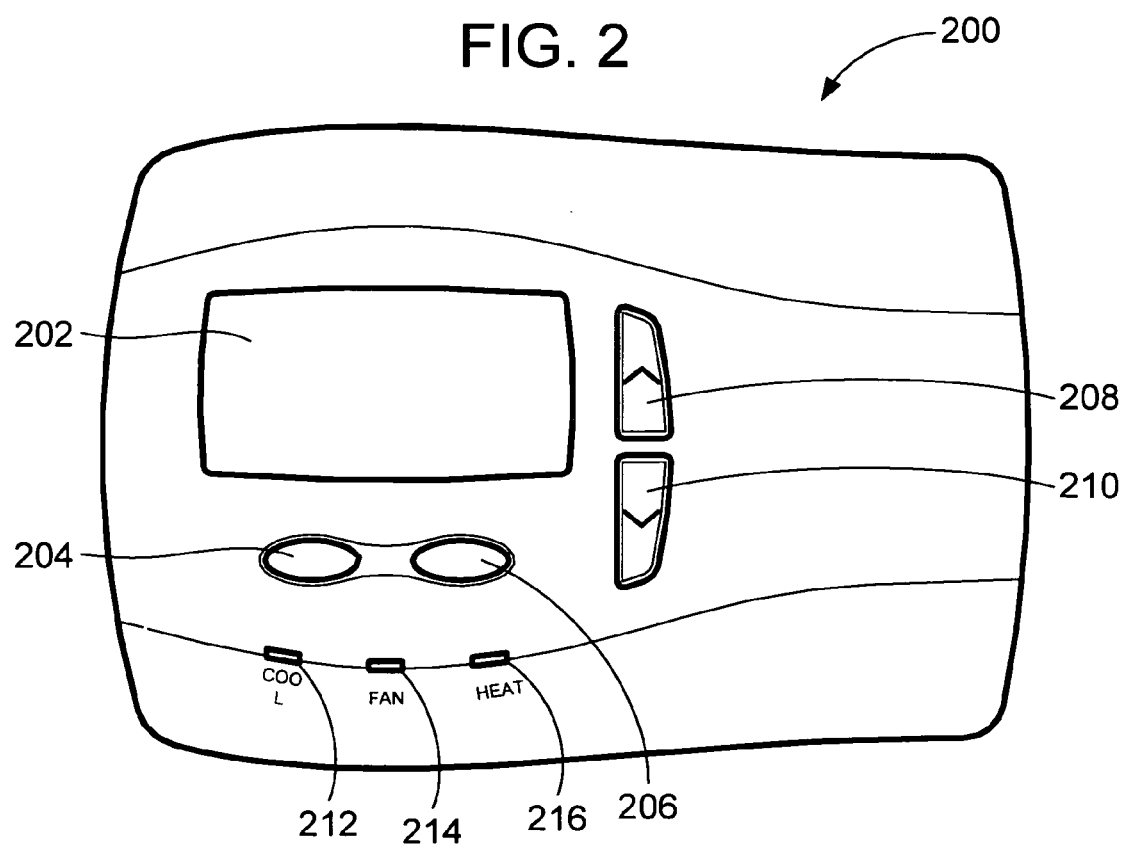
FIG. 2 is a front view illustration of one embodiment of an advanced thermostat constructed in accordance with the teachings of the present invention.

An embodiment of a thermostat constructed in accordance with the teachings of the present invention to incorporate the appliance diagnostic and system test features of the invention is illustrated in FIG. 2. As may be seen from this FIG. 2, this embodiment of the thermostat 200 includes a user display 202 on which is typically displayed programmatic, system, and ambient information regarding the operation of the HVAC system with which it is typically associated. This user display 202 may take various forms as are well-known in the art, and in a preferred embodiment is a dot matrix LCD display.

With such a display 202, the consumer or service person may activate various programmatic and control functions via a pair of soft keys 204, 206. The functionality executed by these soft keys 204, 206 varies dependent upon the programmatic state in which the thermostat 200 is at the time one of the soft keys 204, 206 is depressed. The particular functionality that will be instituted upon selection of one of the soft keys 204, 206 is displayed in an area of the user display 202 proximate the key 204, 206 which will institute that function. That is, the function that will be instituted upon selection of soft key 204 will be located generally in the lower left hand portion of user display 202 while the functionality that will be instituted by selection of soft key 206 will be located generally in the lower right hand portion of user display 202. These functional indicators may change depending on the program state and mode in which the thermostat is currently operating.

In addition to the soft keys 204, 206, this embodiment of the thermostat 200 of the present invention also includes adjustment keys 208, 210. These adjustment keys 208, 210 may serve to adjust a currently selected parameter up or down, such as in the case of setting the control temperature at which the thermostat will maintain the ambient environment. Additionally, these keys 208, 210 may scroll through the available data for a selected parameter, such as scrolling through alphanumeric data that may be selected for a given parameter. Such functionality will be discussed more fully below with regard to the selection of devices for which diagnostic information is desired or on which system tests are to be run. These keys 208, 210 may also function as soft keys depending on the programmatic state in which the thermostat is operating. When this functionality is provided, the function that will be instituted by selection of key 208 will be provided generally in the upper right hand corner of display 202, while the functionality that will be instituted by selection of key 210 will be displayed generally in the lower right hand corner of user display 202. In addition to the above, other user input means, such as an alphanumeric keypad, user rotatable knob, a touch screen, etc. may be utilized instead of the buttons 204–210 illustrated in the embodiment of FIG. 2.

In this embodiment, the thermostat 200 also includes operating mode visual indicators 212, 214, 216. These indicators 212–216 provide a visual indication of the current operating mode of the thermostat. In the embodiment illustrated in FIG. 2, indicator 212 will illuminate while the thermostat 200 is operating in the cooling mode. Indicator 216 will illuminate while the thermostat 200 is operating in the heating mode. Finally, indicator 214 will illuminate to indicate that the fan is operating. Depending on the particular application, this indicator 214 may illuminate whenever the fan is running, or may illuminate only when the fan is selected to run continuously.

In embodiments of the present invention that do not utilize automated switching control between the heating and cooling modes of operation, these indicators 212–216 may operate as user selectable switches to allow the consumer to select the operating mode of the thermostat 200. For example, during the summer months the consumer may select the cooling mode by depressing indicator 212. In this mode, the furnace will not be turned on even if the interior ambient temperature drops below the set point. To switch from the cooling to the heating mode of operation, the consumer, in this alternate embodiment, would need to select indicator 216 to allow the thermostat 200 to operate the furnace. Consumer selection in this embodiment of indicator 214 would operate the fan continuously, as opposed to its normal automatic operation based upon a call for cooling or heat by the thermostat 200. In a still further embodiment of the present invention, as will be discussed more fully below, the indicators 212–216 may also be utilized to provide a visual indication of system trouble or trouble with one of the appliances with which the thermostat 200 is in communication.

Having discussed the physical structure of one embodiment of a thermostat 200 constructed in accordance with the teachings of the present invention, the discussion will now focus on the field usage of the diagnostic information and the operating of the appliance system self tests which form an aspect of the present invention. Indeed, while the following discussion will utilize the structure of the thermostat 200 illustrated in FIG. 2, those skilled in the art will recognize that various other structures can be utilized without departing from the spirit and scope of the present invention. That is, regardless of the user input mechanisms utilized by the particular embodiment of the thermostat 200 of the present invention, the communications, programmatic steps, and display information provided in the following discussion may be used.

Figure 3:
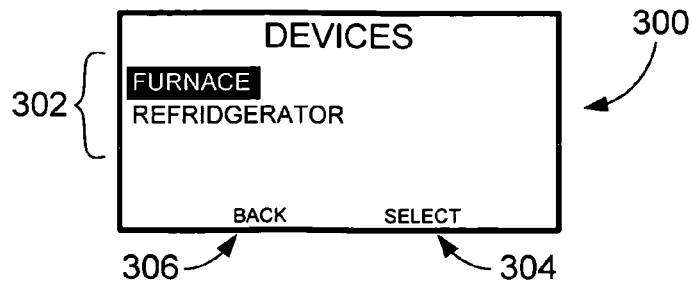
FIGS. 3–7 are exemplary consumer user interface (UI) displays generated by the system of the present invention.

Having described an embodiment of an intelligent thermostat 200, attention is now turned to the user interface display screens generated by an embodiment of the present invention to allow user interoperability with the system of the present invention. As illustrated in FIG. 3, a device selection user interface screen 300 is provided by the system of the present invention to allow selection of available appliances that are capable of being accessed through the system of the present invention. In the exemplary embodiment illustrated in FIG. 3, the device selection screen 300 includes only two appliances, to wit the furnace and the refrigerator. As other appliances are added to the system, they will also be listed on this device selection screen.

As illustrated in this FIG. 3, the furnace is currently selected from the list of available appliances in area 302 of the user interface screen 300. Should the user depress soft key 206, which is proximate to the select function 304, the furnace will be selected, and the system will display the furnace user interface screen 400 illustrated in FIG. 4. However, selection of soft key 204 will return the display to the main menu. If the user wanted, instead, to select the refrigerator, the user would simply maneuver through the listed appliances in area 302 by utilizing the selection keys 208, 210 to scroll through the available appliances.

Figure 4:
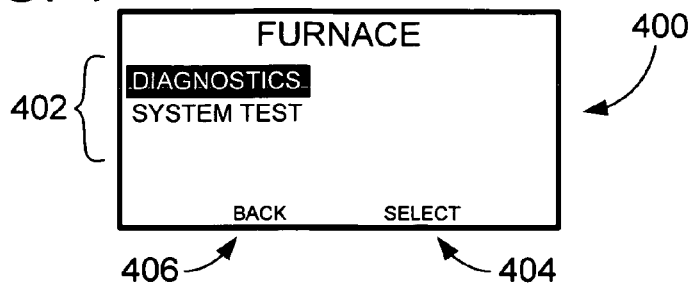

Assuming for a moment that the user has selected the furnace from the appliance selection screen 300, the furnace user interface 400 illustrated in FIG. 4 would be displayed by the system of the present invention. This furnace user interface screen 400 also includes the available options for selection in area 402. In this case the furnace provides either diagnostics or system test selections. As discussed above, selection between the available options provided in area 402 is enabled by the selection keys 208, 210 illustrated in FIG. 2. Once the desired item has been highlighted, the user may actuate soft key 206 corresponding to the select function 404 to move to the appropriate screen. If, however, the user wishes to return from the selected appliance screen, e.g. furnace screen 400, to the appliance selection screen 300, the user would simply actuate soft key 204 corresponding to the back function 406.

Figure 5:
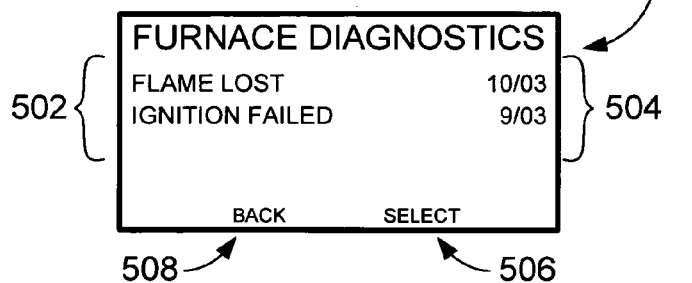

Assuming that the user had selected the diagnostics option from the furnace screen 400, the furnace diagnostic screen 500 illustrated in FIG. 5 will be displayed on the thermostat display 202. This furnace diagnostic screen 500 includes the diagnostic events displayed in area 502 with any subsequent data relating to the event displayed in area 504. In the exemplary furnace diagnostic screen 500 illustrated in FIG. 5, two diagnostic events are logged, to wit, flame lost on October 2003, and ignition failed on September 2003. If additional information is provided by the appliance, the user may select the particular event using the selection keys 208, 210, and then select soft key 206 corresponding to the select function 506 to retrieve the additional information. The user may also select soft key 204 corresponding to the back function 508 to return to the furnace screen 400 illustrated in FIG. 4.

Figure 6:
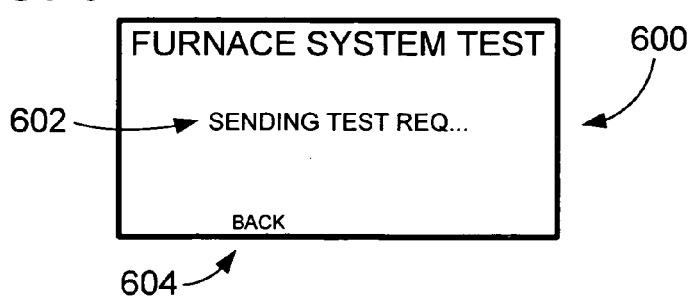

Should a system self-test be provided for the particular appliance selected by the user from the appliance selection screen 300, for example as illustrated in the furnace screen 400 of FIG. 4, selection of the system test will result in the thermostat 200 of the instant invention sending the system test request to the appliance to initiate the system test. To confirm this selection, the furnace system test screen 600 illustrated in FIG. 6 is displayed for user confirmation. As may be seen from this exemplary furnace system test screen 600, a message confirming that the test request has been sent to the appliance is displayed to the user via indication 602. Should the user wish to cancel the furnace system test, the user may select soft key 204 corresponding to the back function 604.

Figure 7:
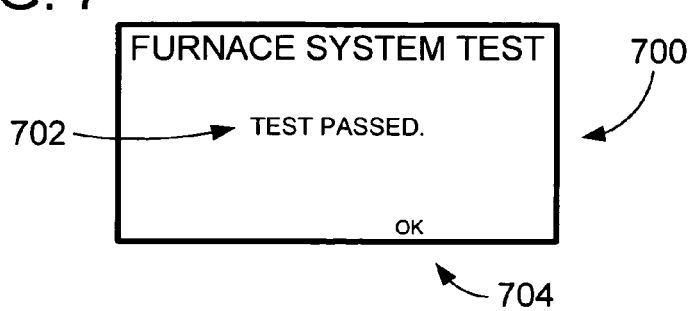

Once the appliance has completed the requested system test, the furnace system test screen 700 illustrated in FIG. 7 will be displayed to the user. This furnace system test results screen 700 includes an indication 702 of the success or failure of the furnace system test. The user may then select soft key 206 corresponding to the OK function 704 to return to the furnace screen 400 illustrated in FIG. 4. If, however, the furnace system test did not pass, indication 702 would so provide. In one embodiment of the present invention the failure to pass the system test will result in the furnace diagnostic screen 500 illustrated in FIG. 5 being displayed along with the appropriate information in area 502 and 504 describing the reason for the failure of the system test.

As will now be recognized from the foregoing by those skilled in the art, the system of the present invention provides a centralized and familiar user interface that may be used by the user as well as service technicians to retrieve diagnostic information from various appliances installed in the home. Additionally, the system of the present invention provides the ability to initiate system self-tests of the appliances through the centralized user interface. Embodiments of the present invention that utilize the wireless communications capability of the system of the present invention recognize additional advantages by not having to run separate wires to each of the appliances to be included in the system, or separately couple to a wired system BUS to perform the functionality discussed above. However, wired embodiments of the present invention also experience significant advantages as discussed above.

While a preferred embodiment of the present invention utilizes the intelligent thermostat 200 to coordinate system operation as discussed above, other embodiments of the system of the present invention utilize a separate central control point to coordinate operation of the system. That is, this central control point need not be a thermostat. The central control point could be a separate controller having a user interface whose functionality is limited to coordination of and communication with the components in the system. This separate controller may be a stand alone controller, may be a PC application, etc. Additionally, in embodiments of the present invention in which an intelligent thermostat provides this central control point, the user interface and the control portions of such a thermostat need not be integrated into a single housing. That is, the user interface may be mounted in a commonly user accessed area for convenience, while the control electronics could be located remotely from the user interface.

All references, including publications, patent applications, and patents, cited herein are hereby incorporated by reference to the same extent as if each reference were individually and specifically indicated to be incorporated by reference and were set forth in its entirety herein.

The use of the terms "a" and "an" and "the" and similar referents in the context of describing the invention (especially in the context of the following claims) is to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed. No language in the specification should be construed as indicating any non-claimed element as essential to the practice of the invention.

Preferred embodiments of this invention are described herein, including the best mode known to the inventors for carrying out the invention. Variations of those preferred embodiments may become apparent to those of ordinary skill in the art upon reading the foregoing description. The inventors expect skilled artisans to employ such variations as appropriate, and the inventors intend for the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

What is claimed is:

1. A method of diagnosing operational status of an appliance, comprising:
   displaying on a user interface display screen of a thermostat at least one diagnostic option;
   receiving a user selection of one of the at least one diagnostic option;
   transmitting an appliance request corresponding to the selected one of the at least one diagnostic option to the appliance;
   receiving diagnostic information from the appliance; and
   displaying the diagnostic information on the user interface display screen of the thermostat.

2. The method of claim 1, wherein the step of displaying on the user interface display screen of the thermostat at least one diagnostic option comprises the step of displaying on the user interface display screen of the thermostat diagnostic options comprising a diagnostics option and a system test option.

3. The method of claim 2, wherein the step of receiving the user selection of one of the diagnostic options comprises the step of receiving a user selection of the diagnostics option, wherein the step of transmitting the appliance request comprises the step of transmitting a request for diagnostic information stored in the appliance; and wherein the step of displaying the diagnostic information comprises the step of displaying a history of the diagnostic information.

4. The method of claim 2, wherein the step of receiving the user selection of one of the diagnostic options comprises the step of receiving a user selection of the system test option, wherein the step of transmitting the appliance request comprises the step of transmitting a request for the appliance to run a self-test; and wherein the step of displaying the diagnostic information comprises the step of displaying self-test results information.

5. The method of claim 1, further comprising the steps of:
   displaying on the user interface display of the thermostat a listing of appliances;
   receiving a user selection of one of the appliances; and
   wherein the step of displaying on the user interface display of the thermostat diagnostic options comprises the step of displaying diagnostic options for the selected one of the appliances.

6. The method of claim 1, wherein the step of transmitting the appliance request corresponding to the selected one of the at least one diagnostic option to the appliance comprises the step of wirelessly transmitting the appliance request corresponding to the selected one of the at least one diagnostic option to the appliance.

7. A thermostat, comprising:
   a user interface display;
   means for communicating diagnostic information with at least one appliance; and
   means for displaying diagnostic information on the user interface display.

8. The thermostat of claim 7, wherein the means for communicating transmits a request for the appliance to run a diagnostic self-test, the means for communicating further receiving self-test results from the appliance, and wherein the means for displaying displays the results on the user interface display.

9. The thermostat of claim 7, wherein the means for communicating transmits a request for diagnostic information stored in the appliance, the means for communicating further receiving diagnostic information from the appliance, and wherein the means for displaying displays the diagnostic information from the appliance on the user interface display.

10. The thermostat of claim 7, further comprising user input means for accepting user input, and wherein the means for displaying diagnostic information displays a listing of appliances, and wherein the means for displaying displays diagnostic options for one of the appliances of the listing upon selection thereof by a user via the user input means.

11. The thermostat of claim 10, wherein the means for communicating transmits a request for diagnostic information stored in the appliance upon selection of a diagnostics option by the user via the user input means, the means for communicating further receiving diagnostic information from the appliance, and wherein the means for displaying displays the diagnostic information from the appliance on the user interface display.

12. The thermostat of claim 10, wherein the means for communicating transmits a request for the appliance to run a diagnostic self-test upon selection of a self-test option by the user via the user input means, the means for communicating further receiving self-test results from the appliance, and wherein the means for displaying displays the results on the user interface display.

13. The thermostat of claim 12, wherein the means for displaying displays a test in progress message on the user interface display during the appliance self-test.

14. An appliance diagnostic network, comprising:
a thermostat having a user interface display;
at least one appliance having an electronic controller in communication with the thermostat; and
wherein the thermostat requests diagnostic information from the electronic controller for the appliance; and
wherein the thermostat displays the diagnostic information from the electronic controller on the user interface display.

15. The network of claim 14, wherein the thermostat requests the electronic controller to run an appliance self-test, and wherein the thermostat displays results of the self-test on the user interface display.

16. The network of claim 15, wherein the thermostat displays a test in progress message on the user interface display until the results are received from the electronic controller.

17. The network of claim 14, wherein the thermostat displays diagnostic options on the user interface display for user selection.

18. The network of claim 14, further comprising a plurality of appliances having an electronic controller in communication with the thermostat, and wherein the thermostat displays a listing of the plurality of appliances on the user interface display for user selection.

19. The network of claim 18, wherein the thermostat displays diagnostic options on the user interface display for user selection for one of the plurality of appliances selected by a user via a user input mechanism of the thermostat.

20. The network of claim 19, wherein the diagnostic options include a diagnostic information retrieval option and an appliance self-test option.

* * * * *